(12) United States Patent
Ohtsuka

(10) Patent No.: US 7,474,768 B2
(45) Date of Patent: Jan. 6, 2009

(54) IMAGE PROCESSING APPARATUS, IMAGE PROCESSING METHOD, AND COMPUTER READABLE MEDIUM STORING PROGRAM

(75) Inventor: Shuichi Ohtsuka, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 830 days.

(21) Appl. No.: 10/601,653

(22) Filed: Jun. 24, 2003

(65) Prior Publication Data

US 2004/0001613 A1 Jan. 1, 2004

(30) Foreign Application Priority Data

Jun. 27, 2002 (JP) ............................... 2002-188774

(51) Int. Cl.
*G06K 9/00* (2006.01)
(52) U.S. Cl. ....................... 382/115; 382/218; 382/219; 382/190; 382/305; 348/231.2
(58) Field of Classification Search ................. 382/115, 382/218, 219, 224, 229, 181, 170, 190, 198, 382/305; 348/231.2; 358/450
See application file for complete search history.

(56) References Cited

U.S. PATENT DOCUMENTS

| 5,017,014 | A | * | 5/1991 | Terashita .................... 356/404 |
| 5,805,215 | A | * | 9/1998 | Mizoguchi ............... 348/231.5 |
| 5,953,500 | A | | 9/1999 | Katakura |
| 6,028,962 | A | | 2/2000 | Claassen et al. |
| 6,301,010 | B1 | | 10/2001 | Kajita |
| 6,389,181 | B2 | * | 5/2002 | Shaffer et al. ............... 382/305 |
| 6,424,429 | B1 | * | 7/2002 | Takahashi et al. .......... 358/1.16 |
| 7,095,514 | B1 | * | 8/2006 | Yamagata et al. .......... 358/1.14 |
| 2001/0046330 | A1 | * | 11/2001 | Shaffer et al. ............... 382/284 |
| 2002/0078038 | A1 | * | 6/2002 | Kotani ........................... 707/3 |
| 2002/0131641 | A1 | * | 9/2002 | Luo et al. .................... 382/218 |
| 2003/0076978 | A1 | * | 4/2003 | Eversole et al. ............. 382/100 |
| 2003/0081145 | A1 | * | 5/2003 | Seaman et al. .............. 348/460 |

FOREIGN PATENT DOCUMENTS

| EP | 0961214 A2 | 12/1999 |
| JP | 2001-325259 | 8/1991 |
| JP | 11-339082 A | 12/1999 |
| JP | 2001-45266 A | 2/2001 |
| JP | 2002-49907 A | 2/2002 |
| JP | 2002-188774 | 3/2002 |
| WO | WO 00/52598 A1 | 9/2000 |

* cited by examiner

*Primary Examiner*—Matthew C Bella
*Assistant Examiner*—Ali Bayat
(74) *Attorney, Agent, or Firm*—Birch, Stewart, Kolasch & Birch, LLP

(57) ABSTRACT

An image processing apparatus for processing image data including: appending information generating unit for receiving image data and generating an appending information based on contents of the image data; correlativity judgment unit for judging correlativity between the received image data and another image data, including the appending information based on the appending information; and correlativity information assignment unit for assigning correlativity information indicating the correlativity to both the received image data and the other image data.

17 Claims, 7 Drawing Sheets

230

| IMAGE DATA ID NO. | CONTENTS | PROCESSING CONDITION |
|---|---|---|
| IMAGE NO. 1 | GROUP PHOTO | TO BE PRINTED AT A SIZE LARGER THAN OR EQUAL TO A4 SIZE |
| IMAGE NO. 1 | FAMILY PHOTO | TO BE COMPOSED WITH THE TEMPLATE OF A CHRISTMAS CARD IF THE PHOTOGRAPHY MONTH IS BETWEEN SEPTEMBER AND DECEMBER |
| ⋮ | ⋮ | ⋮ |

| | CONTENTS | | |
|---|---|---|---|
| IMAGE DATA ID NO. | BRIGHTNESS | SUBJECT SIZE | FILM MANUFACTURER |
| IMAGE NO. 1 | 80 | 30 | A |
| IMAGE NO. 2 | 45 | 21 | A |
| IMAGE NO. 3 | 58 | 32 | B |
| ⋮ | ⋮ | ⋮ | ⋮ |

| IMAGE DATA ID NO. | OBJECT FOR CORRELATIVITY JUDGMENT | IMAGE NO. 1 | IMAGE NO. 2 | IMAGE NO. 3 | ... |
|---|---|---|---|---|---|
| IMAGE NO. 1 | | | 65 | 12 | ... |
| IMAGE NO. 2 | | 65 | | N/A | ... |
| IMAGE NO. 3 | | 12 | N/A | | ... |
| ... | | ... | ... | ... | ... |

| | | 250, 260 |
|---|---|---|
| IMAGE ID NO. | colspan | IMAGE NO. 1 |
| ORIGIN | DESTINATION | DATE |
| IMAGE PROCESSING APPARATUSES 20B | IMAGE PROCESSING APPARATUSES 20C | 2001/5/30 |
| IMAGE PROCESSING APAPRATUSES 20C | IMAGE PROCESSING APPARATUSES 20A | 2001/10/7 |
| ⋮ | ⋮ | ⋮ |
| PRINTING APPARATUS | PRINTING DATE | DETAILED INFORMATION FOR PRINTING |
| IMAGE PROCESSING APPARATUSES 20B | 2001/4/1 | 20-SHEET STANDARD SIZE |
| IMAGE PROCESSING APPARATUSES 20C | 2001/8/31 | 1-SHEET EXTRA LARGE SIZE |
| ⋮ | ⋮ | ⋮ |

FIG. 5

IMAGE PROCESSING APPARATUS, IMAGE PROCESSING METHOD, AND COMPUTER READABLE MEDIUM STORING PROGRAM

This patent application claims priority from a Japanese patent application No. 2002-188774 filed on Jun. 27, 2002, the contents of which are incorporated herein by reference.

BACKGROUND OF THE INVENTION

1. Field of the Invention

The present invention relates to an image processing apparatus, an image processing method, and a computer readable medium storing program. More particularly, the present invention relates to an image processing apparatus, an image processing method, and a computer readable medium storing program for processing an image based on correlativity between images.

2. Description of Related Art

For judging similarity and correlativity between an image data and another image data, an apparatus, such as a fingerprint identification apparatus or the like, has been used. According to the apparatus, the other image data, of which the correlativity with the image is higher than a predetermined reference value, is selected so as to perform user authentication and the like.

However, the apparatus stores the correlativity between one image data and a plurality of other image data in association with only the one image data. Therefore, the information on the correlativity, which has been already judged, is not used efficiently when a part of the plurality of other image data is to be used for another purpose.

SUMMARY OF THE INVENTION

Therefore, it is an object of the present invention to provide an image processing apparatus, an image processing method and a computer readable medium storing thereon program which can solve the foregoing problems. The above and other objects can be achieved by combinations described in the independent claims. The dependent claims define further advantageous and exemplary combinations of the present invention.

According to the first aspect of the present invention, there is provided an image processing apparatus including: appending information generating means for receiving image data and generating an appending information based on contents of the image data; correlativity judgment means for judging correlativity between the image data and another image data including the appending information based on the appending information; and correlativity information assignment means for assigning correlativity information indicating the correlativity to the received image data and the other image data.

Moreover, the image processing apparatus may further include maintenance judgment means for judging whether the image data is to be maintained based on the correlativity information.

Moreover, the image processing apparatus may further include a communication unit for communicating with another image processing apparatuses, and when it is judged that the image data is not to be maintained, the maintenance judgment means causes the communication unit to transfer the image data to another image processing apparatuses.

Moreover, the maintenance judgment means may add information for identifying an image processing apparatus, which is an origin of the image data, and the information for identifying another image processing apparatus, which is a destination of the image data, to the image data as a transference history of the image data when the image data is to be transferred.

Moreover, the image processing apparatus may further include appending information attaching means for attaching the appending information to the image data.

Moreover, the image processing apparatus may further include composite means for composing the image data with the other image data based on the correlativity information.

Moreover, the appending information generating means may generate information indicating contents of the image data as the appending information by analyzing the image.

Moreover, the appending information generating means may generate processing conditions for processing the image data as the appending information by analyzing the image.

Moreover, the image processing apparatus may further include selection means for selecting the other image data, which is to be used for judgment of the correlativity, using at least a part of the appending information.

Moreover, the selection means may repeat to select the plurality of other image data until a predetermined number of the other image data are selected.

Moreover, the correlativity judgment means may further judge whether the correlativity between the selected other image data and the image data is higher than a predetermined value, and the selection means may repeat to select the plurality of other image data until the other image data, of which the correlativity with the image data is higher than the predetermined value, are selected more than a predetermined number.

According to the second aspect of the present invention, there is provided an image processing apparatus, including: appending information generating means for generating appending information based on contents of an image data when the image data is received; correlativity judgment means for judging a correlativity between the image data and another image data from which the appending information is generated based on the appending information; and maintenance judgment means for judging whether the image data is to be maintained based on the correlativity.

According to the third aspect of the present invention, there is provided an image processing method, including steps of: receiving image data and generating appending information based on contents of the image data; judging correlativity between the image data and another image data including the appending information based on the appending information; and assigning correlativity information indicating the correlativity to the received image data and the other image data.

According to the fourth aspect of the present invention, there is provided an image processing method, including steps of: generating appending information based on contents of an image data when the image data is received; judging a correlativity between the image data and another image data from which the appending information is generated based on the appending information; and judging whether the image data is to be maintained based on the correlativity.

According to the fifth aspect of the present invention, there is provided a computer readable medium storing thereon a program for causing a computer to function as: appending information generating means for receiving image data and generating appending information based on contents of the image data; correlativity judgment means for judging correlativity between the image data and another image data including the appending information based on the appending information; and correlativity information assignment means for assigning correlativity information indicating the correlativity to the received image data and the other image data.

According to the sixth aspect of the present invention, there is provided a computer readable medium storing thereon a program for causing a computer to function as: appending information generating means for generating appending information based on contents of an image data when the image data is received; correlativity judgment means for judging a correlativity between the image data and another image data from which the appending information is generated based on the appending information; and maintenance judgment means for judging whether the image data is to be maintained based on the correlativity.

The summary of the invention does not necessarily describe all necessary features of the present invention. The present invention may also be a sub-combination of the features described above.

BRIEF DESCRIPTION OF THE DRAWINGS

FIGS. 3A and 3B are tables exemplary showing information attached by appending information attaching means.

FIG. 4 is a table exemplary showing correlativity information judged by correlativity judgment means.

FIG. 5 is a table exemplary showing information attached by composite means and maintenance judgment means.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
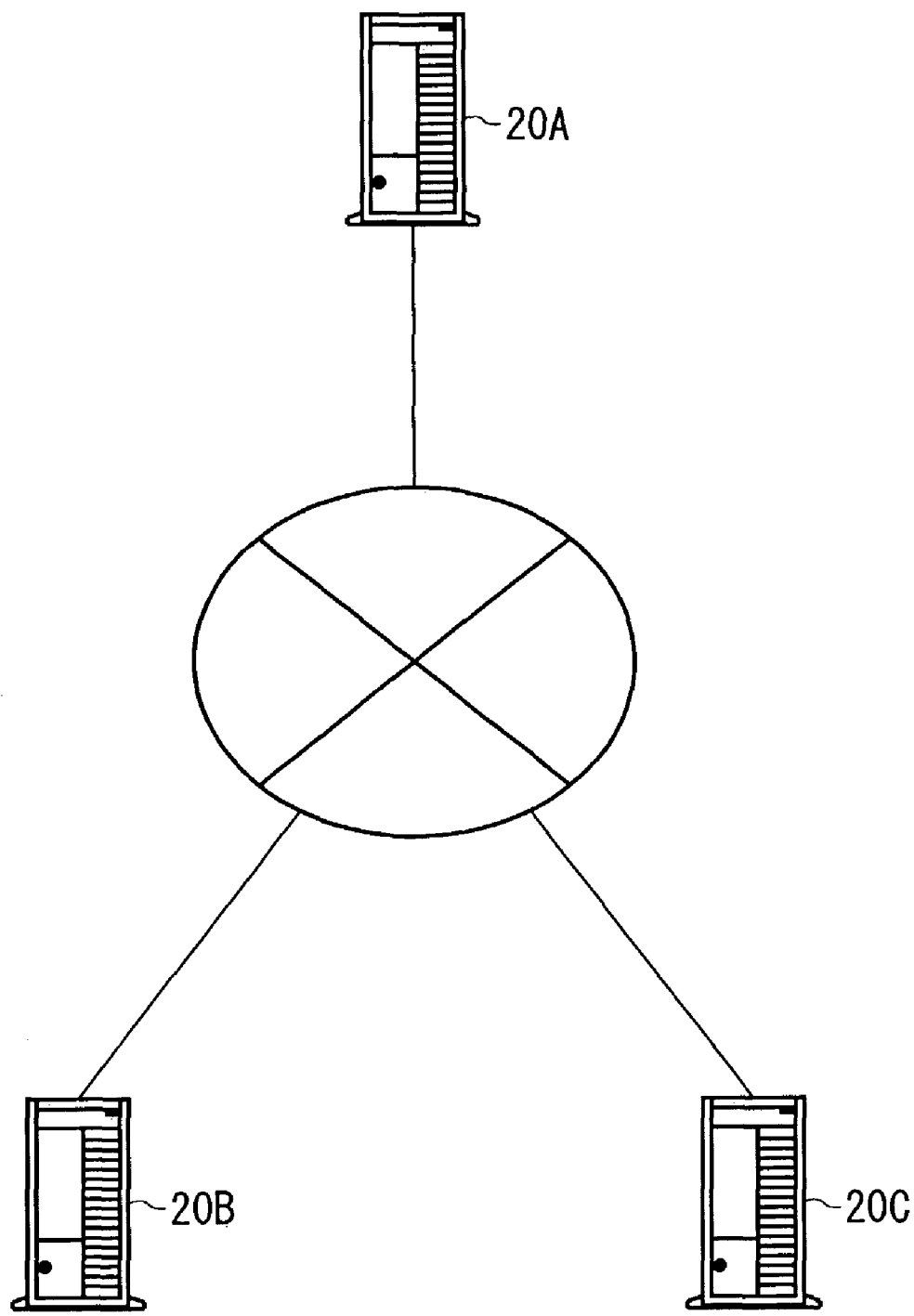
FIG. 1 is a schematic diagram of an information processing system.

FIG. 1 is a schematic diagram of an information processing system 10. It is an object of the information processing system 10 to judge the correlativity between a plurality of image data in an image processing apparatus. Accordingly, the information processing system 10 transfers an image data having a low correlativity with the other image data, so that the processing, such as image composition, is performed between the image data having high correlativity.

The information processing system 10 includes image processing apparatuses 20A, 20B and 20C which connect with one another through a network. Each of the image processing apparatuses 20A, 20B and 20C includes a plurality of image data and process the image data. Moreover, the image processing apparatuses 20A, 20B and 20C transfer the image data to and from one another when necessary.

Alternatively, each of the image processing apparatuses 20A, 20B and 20C is a server computer provided as a single unit composed in a body casing or a computer system constituted by a plurality of computers. Moreover, according to FIG. 1, although the information processing system 10 includes three separate image processing apparatuses 20, it may include one computer system in another example. In this case, the information processing system 10 virtually separates the computer system to three virtual spaces using a software, so that these virtual spaces function as the respective image processing apparatuses 20A, 20B and 20C.

Figure 2:
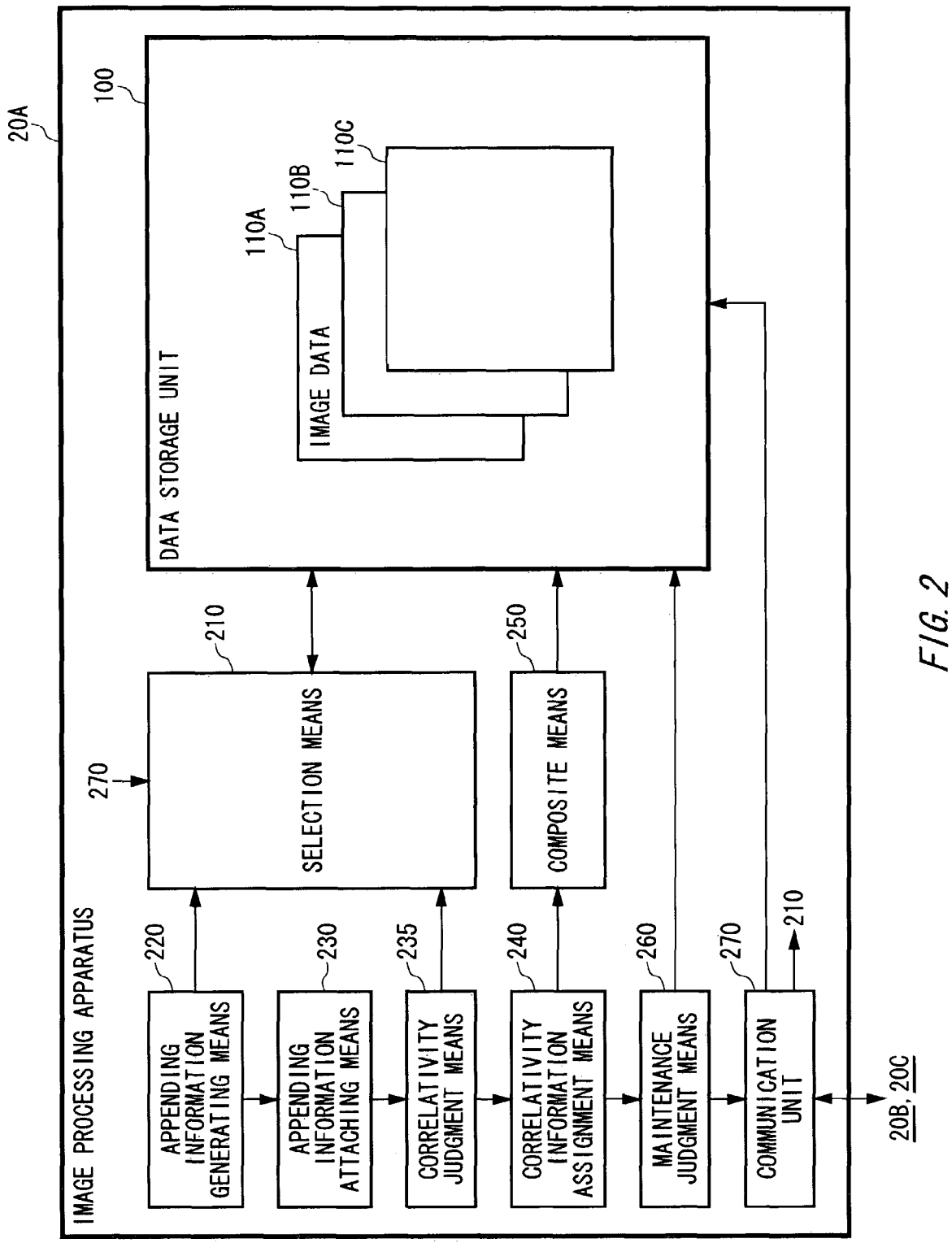
FIG. 2 is a functional block diagram of image processing apparatus.

FIG. 2 is a functional block diagram showing the image processing apparatus 20A. The image processing apparatus 20A includes a data storage unit 100, selection means 210, appending information generating means 220, appending information attaching means 230, correlativity information assignment means 240, composite means 250, maintenance judgment means 260, and a communication unit 270. Since configuration of each of the image processing apparatus 20B and the image processing apparatus 20C is substantially the same as that of the image processing apparatus 20A, the explanation of the image processing apparatuses 20B and 20C will be omitted.

The data storage unit 100 stores a plurality of image data 110. For example, image data 110A is a still image photographed by a camera of a user, or a movie played with information such as sound or characters. For example, the data, such as image data recorded in a memory of a digital camera, image and sound data in a memory of a camera module of a portable telephone, and image data of a digital television, which is transmitted by electric wave and recorded in a memory, are input into the image processing apparatus 20A by the user, and the image and sound data become the image data 110.

The data storage unit 100 transmits the image data to the selection means 210 or the composite means 250 according to the demand from the selection means 210 or the composite means 250. Moreover, the data storage unit 100 maintains the image data or deletes the image data in the data storage unit 100 according to an instruction from the communication unit 270. Since the image data 110B and the image data 110C has substantially the same as the image data 110A, the explanation of the image data 110B and 110C will be omitted.

If the selection means 210 receives an image data selection instruction instructing to select additional image data from the communication unit 270, the selection means 210 selects the image data additionally received by the communication unit 270 from the data storage unit 100, and sends it to the appending information generating means 220. Moreover, if the selection means 210 receives the additional image data selection instruction, the selection means 210 judges the correlativity between the image data and the image data in the data storage unit 100 which includes the appending information. The selection means 210 selects the image data from the data storage unit 100, the image data having a higher correlativity than a predetermined value with the appending information received from the appending information attaching means 230. Then, the selection means 210 sends the selected image data to the correlativity information assignment means 240.

In this way, the selection means 210 selects another image data, of which the correlativity is to be judged by the correlativity information assignment means 240, using at least a part of the appending information. Alternatively, if the total number of the image data in the data storage unit 100 is less than a predetermined number, the selection means 210 selects the image data, of which the correlativity is less than the predetermined value, and sends it to the correlativity information assignment means 240.

The appending information generating means 220 receives the image data from the selection means 210, and generates the appending information by analyzing the contents of the image data. Then, the appending information generating means 220 sends the image data and the generated information to the appending information attaching means 230 as the appending information.

After the appending information attaching means 230 receives the image data and the appending information from the appending information generating means 220, the appending information attaching means 230 attaches the appending information to the image data. Then, the appending information attaching means 230 sends the image data, to which the appending information is attached, to the correlativity information assignment means 240.

For example, if the image data is handled as a file by an operating system, the appending information attaching means 230 attaches the appending information by writing the received appending information in the file of the image data. Moreover, the appending information attaching means 230 stores the appending information in an area in the data storage unit 100 and writes the information about the storage area of the appending information to the image data, so as to refer the user to the image data easily.

In this case, the appending information attaching means 230 translates the appending information into a language such as XML which is exchangeable between different platforms, and attaches it to the image data. In this case, the appending information attaching means 230 attaches information indicating a protocol standard indicating the form of the data. Alternatively, the appending information attaching means 230 embeds the appending information in the image data using so called the digital watermarking technology.

A correlativity judgment means 235 receives the image data from the appending information attaching means 230 (to be referred to as "main image data" hereafter), and receives at least one image data from the selection means 210 (to be referred to as "sub image data" hereafter). Then, the correlativity judgment means 235 judges the correlativity between the main image data and the sub image data based on the appending information associated with these image data. Then, the correlativity judgment means 235 sends the main image data, the sub image data, and the information on the correlativity associated with the sub image data to the correlativity information assignment means 240.

Moreover, the correlativity judgment means 235 sends an image data additional selection instruction, which instructs to select an additional image data of which the correlativity is to be judged, to the selection means 210 according to the result of the correlativity judgment. Alternatively, if the correlativity between the main image data and the sub image data has been already attached to these image data, the correlativity judgment means 235 omits the judgment of the correlativity.

The correlativity information assignment means 240 assigns the received correlativity information to both the main image data and the sub image data. Then, the correlativity information assignment means 240 sends both the main image data and the sub image data to each of the composite means 250 and the maintenance judgment means 260.

The composite means 250 receives the main image data and the sub image data from the correlativity information assignment means 240. Then, the composite means 250 selects one of the sub image data based on the correlativity information assigned to each of the main image data and the sub image data. Then, the composite means 250 composes the selected sub image data and the main image data, and stores it in the data storage unit 100.

The maintenance judgment means 260 receives the main image data and the sub image data from the correlativity information assignment means 240. Then, the maintenance judgment means 260 judges whether to maintain the main image data based on the correlativity information assigned to the main image data and the sub image data. The maintenance judgment means 260 sends an instruction ordering the transference of the main image data with the main image data to the communication unit 270, and sends an instruction to delete the main image data to the data storage unit 100, so as to delete the main image data from the image processing apparatus 20A.

The communication unit 270 transmits the image data to the image processing apparatus 20B, the image processing apparatus 20C, etc., on receiving the instruction to transfer the image data with the image data. Moreover, the communication unit 270 receives the image data from the image processing apparatus 20B and the image processing apparatus 20C, and stores the data storage unit 100 with the image data. Then, every time the communication unit 270 receives the image from the image processing apparatus 20B and the image processing apparatus 20C, the communication unit 270 sends a selection instruction of the image data to the selection means 210. As another example of the timing for transmitting the selection instruction of the image data, every time the communication unit 270 receives a predetermined number of the image data from the image processing apparatus 20B and the image processing apparatus 20C, the communication unit 270 sends the image data selection instruction. That is, the communication unit 270 causes the selection means 210 to repeat the processing whenever the contents of the data storage unit 100 is changed more than a predetermined amount. Alternatively, the communication unit 270 transmits the image data to another image processing apparatus according to electronic signature information, which is associated with the image data in advance. For example, if the electronic signature information does not permit a certain image processing apparatus to process the image data, the communication unit 270 transmits the image data to another image processing apparatus.

In this way, the image processing apparatus 20A composes the images based on the correlativity between the selected image data and the other image data. As a result, the image processing apparatus 20A uses the image data having high correlativity for the image processing such as image composition by transferring the image data having low correlativity with the other image data to another image processing apparatuses.

FIGS. 3A and 3B are tables exemplary showing the information attached by the appending information attaching means 230. FIG. 3A is a table exemplary showing the appending information attached by the appending information attaching means 230. In FIG. 3A, the appending information attaching means 230 associates contents and processing conditions of the image with an image data identification number. For example, the appending information generating means 220 generates information indicating that the image is "a group photo" by analyzing the image of "Image No. 1". Then, the appending information attaching means 230 attaches contents information "group photo" to the image of "Image No. 1". Similarly, the appending information generating means 220 generates the image processing conditions indicating that the image is preferably printed at a size larger than or equal to A4 size, by analyzing the image of "Image No. 1". Then, the appending information attaching means 230 attaches the image processing condition to the image of "Image No. 1". As another example of the information to be generated, the appending information generating means 220 generates the information indicating a scene of the subject. For example, the appending information generating unit 220 generates information indicating "portrait", or information indicating "moon over a mountain".

In this way, the appending information attaching means 230 provides the contents of the image and/or the processing conditions of the image to a user.

FIG. 3B shows another example of the appending information attached by the appending information attaching means 230. The appending information attaching means 230 attaches a plurality of appending information to the image data, the appending information indicating the contents of the image data, such as brightness, size of subject and manufacturer of film. Alternatively, as another example of the appending information attached by the appending information attaching means 230, the appending information attaching means 230 attaches information such as information of photographer presumed from owner of the digital camera, photography date, and/or information on photography equipment, based on the information of the EXIF form attached at the time of the image data generation. In this case, the appending information attaching means 230 provides the user with an analysis result of the image data, which has been analyzed from a plurality of viewpoints, with the image data, in a multidimensional vector.

FIG. 4 is a table exemplary showing the correlativity information provided by the correlativity information assignment means 240. The correlativity judgment means 235 judges the correlativity between the image of "Image No. 1" (e.g., the main image data), and each of the images of "Image No. 2" and "Image No. 3" (e.g., the sub image data), which are the other image data, and converts the correlativity to a numerical value. For example, since both "Image No. 1" and "Image No. 2" shown in FIG. 3B are photographed using films manufactured by the same film manufacturer the correlativity judgment means 235 evaluates the correlativity between these two images to be 65. Then, the correlativity information assignment means 240 assigns the correlativity information to the main image data in association with the identification information of the sub image data, of which the correlativity is to be judged.

In this way, the correlativity information assignment means 240 assigns the correlativity information to both the image data and the other image data of which the correlativity is to be judged.

FIG. 5 is a table exemplary showing information attached by the composite means 250 and the maintenance judgment means 260. The composite means 250 and the maintenance judgment means 260 attach a processing history as shown in the FIG. 5 to the image data of which the image identification information is "Image No. 1". That is, if the maintenance judgment means 260 judges that the image data is not to be stored and transfers the image data to another image processing apparatuses, the maintenance judgment means 260 attaches information identifying an origin image processing apparatus of the image data, and information identifying a destination image processing apparatus of the image data to the image data in association with date of the transference. For example, as shown in FIG. 5, when the image data of "Image No. 1" is transferred from the image processing apparatus 20B to the image processing apparatus 20C, the maintenance judgment means 260 attaches the identification information of the image processing apparatus 20B, which is the origin of the image data, and the identification information of the image processing apparatus 20C, which is the destination of the image data, in association with the date "2001/5/30", which is the date of the transference, to the image data of "Image No. 1".

On the other hand, if the image data is composed or processed (e.g., printing of the image), the composite means 250 associates information about apparatus by which the composition and the processing is performed (e.g., the printing apparatus) and date (e.g., printing date) with detailed information about the composition and the processing (e.g., detailed information for printing), and attaches them to image data. For example, if 20 sheets of the image data of "Image No. 1" are printed at standard size by the image processing apparatus 20B on Apr. 1, 2001, the composite means 250 associates "image processing apparatus 20B", which is the printing apparatus, and "2001/4/1", which is the printing date, with "20-sheet standard size", which is the detailed information for printing, and attaches them to the image data of "Image No. 1". As another example of the detailed information for printing, the composite means 250 attaches information, such as information of a photo shop, delivery date of the photograph, and/or a price of the photograph.

In this way, the composite means 250 and the maintenance judgment means 260 attach the processing history, such as transference history or the printing history, to the image data as the additional information. Therefore, even if the composite means 250 is to process the image data which is additionally received by the image processing apparatus, the processing optimized for the image data is performed by referring to the processing history of the image data.

Figure 6:
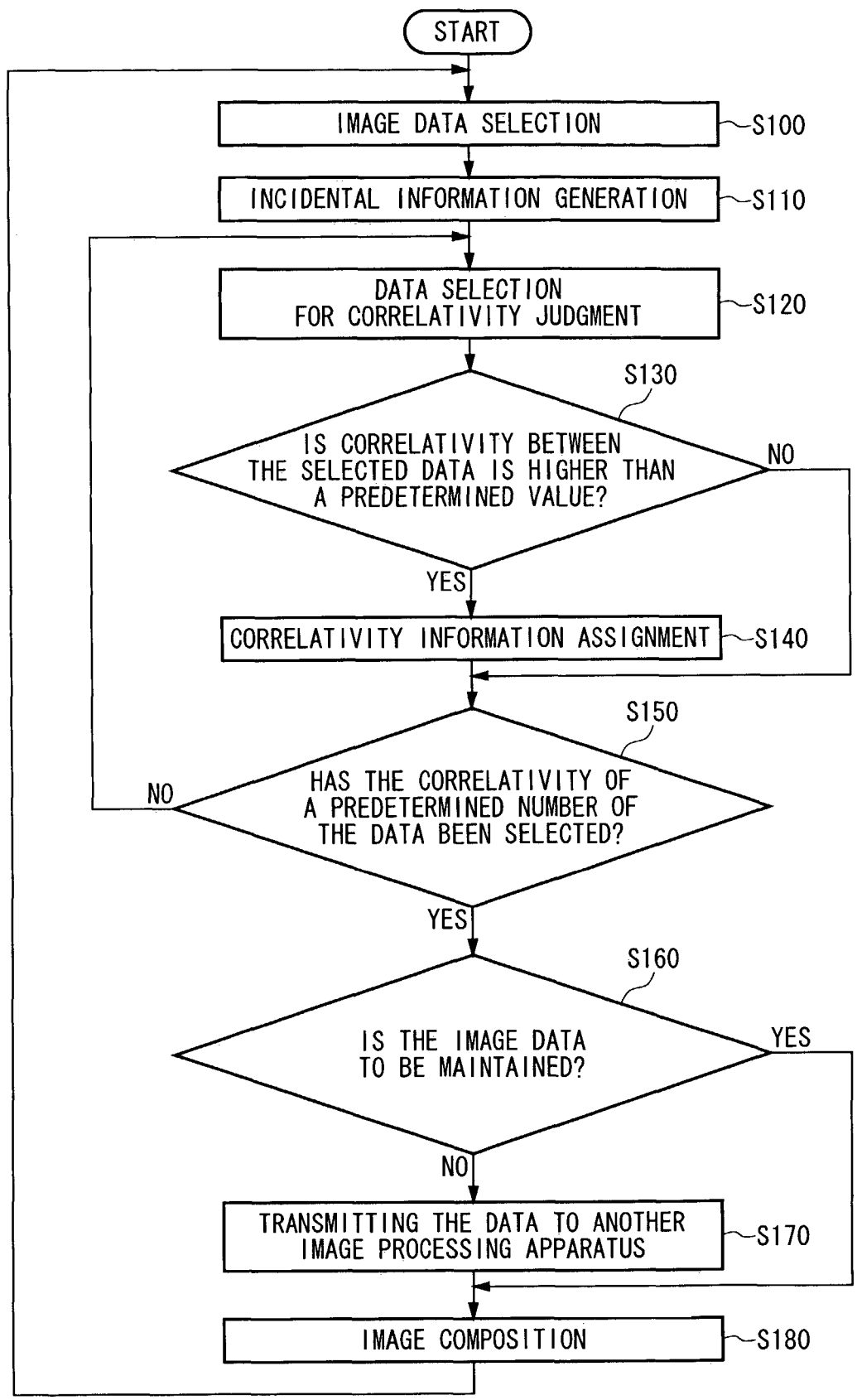
FIG. 6 is a flow chart indicating operating sequence of the image processing apparatus.

FIG. 6 is a flow chart indicating operating sequence of the image processing apparatus 20A. The selection means 210 selects an image data (e.g., the main image data) according to the instructions from the communication unit 270 (S100). Then, the appending information generating means 220 generates the appending information by analyzing the main image data (S110), and the appending information attaching means 230 attaches the appending information to the main image data. The selection means 210 selects the image data (e.g., the sub image data), of which the correlativity with the main image data is to be judged (S120). If the selection means 210 judges that the correlativity between the main image data and the sub image data is higher than a predetermined reference value (S130: YES), the correlativity information assignment means 240 provides both the main image data and the sub image data with the correlativity information on the main image data and the correlativity information on the sub image data, which is data used for the correlativity judgment (S140). Then, the correlativity judgment means 235 selects the sub image data, of which the correlativity is to be judged, more than a predetermined number, and judges whether the correlativity has been judged (S150) If the correlativity judgment means 235 judges that the correlativity of the predetermined number of the sub image data has not been judged (S150: NO), the sequence returns to S120.

In this way, the selection means 210 repeats to select the image data until it selects the image data, of which the correlativity is higher than the predetermined reference value, more than the predetermined number.

Then, based on the correlativity information on the main image data and the sub image data, if the maintenance judgment means 260 judges that the main image data is not to be maintained (S160: NO), it deletes the main image data from the data storage unit 100 and causes the communication unit 270 to transmit the main image data to another image processing apparatus (S170). For example, the maintenance judgment means 260 judges that the main image data is not to be maintained if only the sub image data, of which the correlativity with the main image data is lower than the predetermined reference value, is received. More particularly, as the predetermined reference value, if an average of the correlativity between the main image data and the sub image data is less than an average of the correlativity among the image data in the image processing apparatus 20A, the maintenance judgment means 260 judges that the main image data is not to be maintained.

Moreover, if needed, based on the correlativity information, the composite means 250 composes the main image data and the sub image data to generate a new image data (S180), and store it in the data storage unit 100. For example, if the main image data is a landscape and the sub image data is a portrait, the composite means 250 composes the person and the scenery. Alternatively, if the sub image data is a template for image ornament, the composite means 250 selects the sub image data suitable for a template of the main image data based on the correlativity information, and composes them.

In this way, based on the image data, the image processing apparatus 20A generates the appending information and the correlativity information, and attaches them to the image data. Moreover, as shown in FIG. 6, the image processing apparatus 20A does not have to judge the correlativity between the image data and all the other image data in the data storage unit 100. Therefore, the image processing apparatus 20A neglects a part of the image data, of which the correlativity is to be judged, according to performance of hardware which realizes the image processing apparatus 20A.

Figure 7:
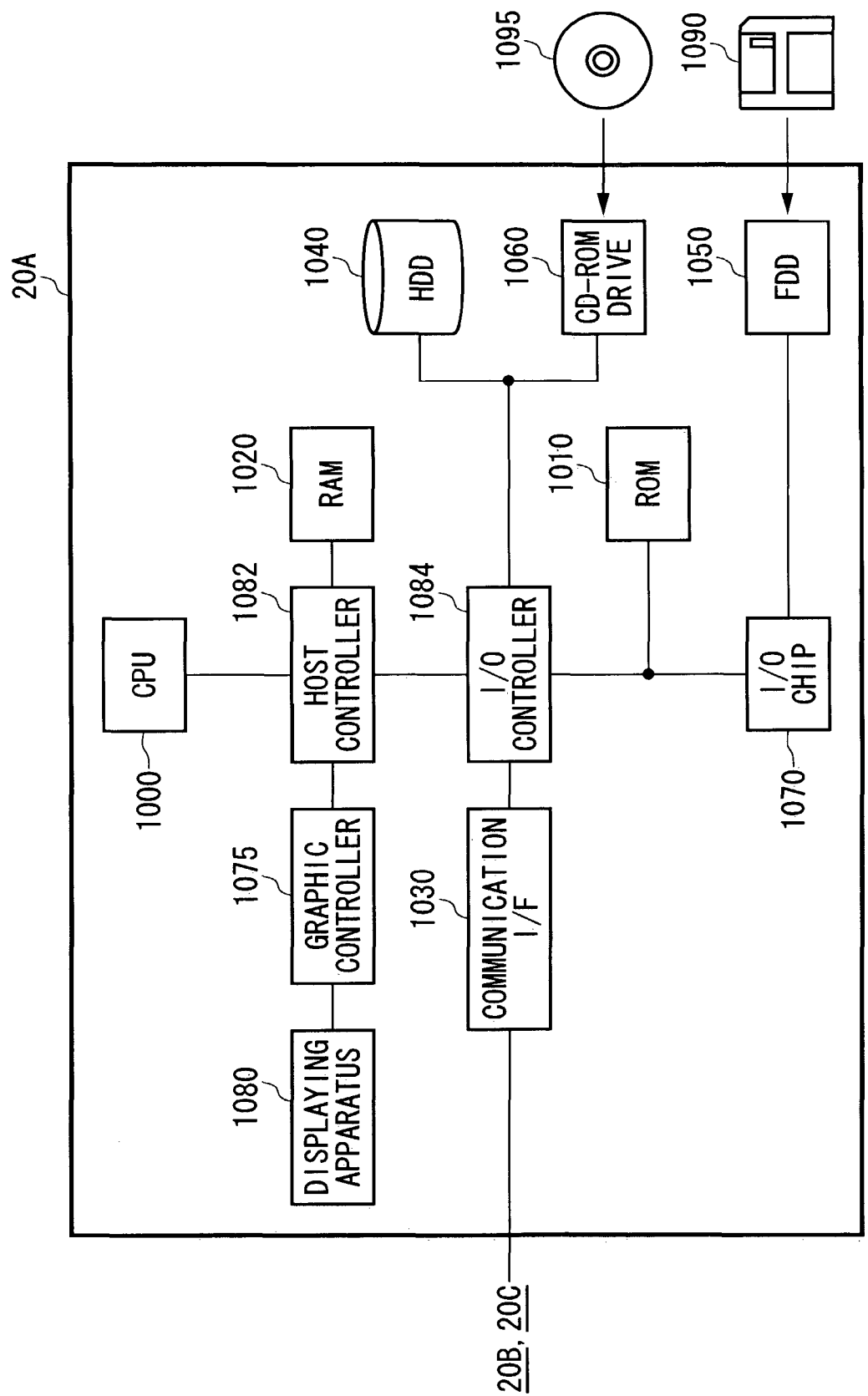
FIG. 7 is a drawing exemplary showing a hardware configuration of the image processing apparatus.

FIG. 7 is a drawing exemplary showing a hardware configuration of the image processing apparatus 20A. According to the present embodiment, the image processing apparatus 20A includes: a CPU peripheral unit including CPU 1000, RAM 1020, a graphic controller 1075, and a displaying apparatus 1080, which are mutually connected to one another through a host controller 1082; an input-and-output unit including a communication interface 1030, a hard disk drive 1040, and a CD-ROM drive 1060 which are connected to the host controller 1082 through an input/output controller 1084; and a legacy input-and-output unit including ROM 1010, a flexible disk drive 1050, and an input-and-output chip 1070 which are connected to the input/output controller 1084.

The host controller 1082 connects the RAM 1020, with the CPU 1000 and the graphic controller 1075 which access to the RAM 1020 at a high transfer rate. The CPU 1000 operates based on the program stored in the ROM 1010 and the RAM 1020 to control each part. The graphic controller 1075 acquires the image data generated by the CPU 1000 or the like in frame buffer in the RAM 1020, and causes the displaying apparatus 1080 to display the image data. Alternatively, the graphic controller 1075 includes the frame buffer for storing the image data generated by the CPU 1000 or the like.

The input/output controller 1084 connects the host controller 1082 with the communication interface 1030, the hard disk drive 1040, and the CD-ROM drive 1060, which are comparatively high speed I/O devices. The communication interface 1030 communicates with other apparatuses, such as the image processing apparatus 20B or the image processing apparatus 20C, through a network. The hard disk drive 1040 stores program and data which is used by the image processing apparatus 20A. The CD-ROM drive 1060 reads program and/or data in a CD-ROM 1095, and provides the input-and-output chip 1070 with the program and/or the data through the RAM 1020.

Moreover, the ROM 1010 and comparatively low speed I/O devices, such as the flexible disk drive 1050 and the input-and-output chip 1070, are connected to the input/output controller 1084. The ROM 1010 stores a boot program executed by the CPU 1000 during startup of the image processing apparatus 20A, a program depending on the hardware of the image processing apparatus 20A, etc. The flexible disk drive 1050 reads program or data in a flexible disk 1090, and provides the input-and-output chip 1070 with it through the RAM 1020. The input-and-output chip 1070 connects various kinds of I/O devices through the flexible disk 1090, a parallel port, a serial port, a keyboard port, a mouse port, etc. Moreover, the input-and-output chip 1070 receives data corresponding to a user's input from an input device, and provides it to the program executed by the image processing apparatus 20A.

The program provided to the image processing apparatus 20A is stored in a record medium, such as the flexible disk 1090, the CD-ROM 1095 or an IC card, which are provided by the user. The program is read from the record medium, installed in the image processing apparatus 20A through the input-and-output chip 1070, and executed by the image processing apparatus 20A.

The program realizing the image processing apparatus 20A includes a data storage module, a selection module, an appending information generating module, an appending information attaching module, a correlativity judgment module, a correlativity information assignment module, a composite module, a maintenance judgment module, and a communication module. These modules are programs for causing the image processing apparatus 20A to function as the data storage unit 100, the selection means 210, the appending information generating means 220, the appending information attaching means 230, the correlativity judgment means 235, the correlativity information assignment means 240, the composite means 250, the maintenance judgment means 260, and the communication unit 270.

The program or the module shown above is stored in an external storage medium. It is possible to use an optical record medium such as DVD or PD, a magneto-optical record medium such as Minidisk, a tape medium, a magnetic record medium or a semiconductor memory such as an IC card or a Miniature Card as a record medium instead of the flexible disk 1090 and the CD-ROM 1095. A storage device, such as a hard disk or RAM in a server system on a dedicated communication network or the Internet, may be used as a record medium and the program may be provided to the image processing apparatus 20A via the communication network.

Since a hardware configuration of each of the image processing apparatus 20B and the image processing apparatus 20C is substantially the same as that of the image processing apparatus 20A, the explanation of the image processing apparatuses 20B and 20C will be omitted.

It is obvious from the above explanation that the information processing system 10 judges whether the image data is to be maintained in the image processing apparatus, or it is to be transferred to another image processing apparatuses, based on the correlativity between the image data and the other image data. Therefore, the information processing system 10 transfers the image data among the plurality of image processing apparatuses, and collects the image data having a high correlativity with each of the image processing apparatus as a result. Therefore, the information processing system 10 appropriately processes the image data by composing the image data with another image data having high correlativity with the image.

As described above, according to the present invention, there is provided the image processing apparatus for appropriately processing the image.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image processing apparatus, comprising:
appending information generating means for generating appending information based on contents of an image data when the image data is received from outside of the image processing apparatus;
a data storage unit for storing an other image data including the appending information;
correlativity judgment means for judging a correlativity between the image data and the another image data based on the appending information;
maintenance judgment means for judging whether the received image data is to be maintained in the data storage unit based on the correlativity, wherein
when the maintenance judgment means judges that the image data is not to be maintained, the maintenance judgment means deletes the received image data from the image processing apparatus,
a communication unit for communicating with other image processing apparatuses, wherein when it is judged that the image data is not to be maintained, said maintenance judgment means causes said communication unit to transfer the image data to the other image processing apparatuses;
wherein said maintenance judgment means attaches information for identifying an image processing apparatus, which is an origin of the image data, and the information for identifying the other image processing apparatuses, which is a destination of the image data, to the image data as a transference history of the image data when the image data is to be transferred.

2. An image processing apparatus, comprising:
appending information generating means for generating appending information based on contents of an image data when the image data is received from outside of the image processing apparatus;
a data storage unit for storing an other image data including the appending information;
correlativity judgment means for judging a correlativity between the image data and the other image data based on the appending information;
a communication unit for communicating with other image processing apparatuses; and
maintenance judgment means for judging whether the received image data is to be maintained in the data storage unit based on the correlativity, wherein
when it is judged that the image data is not to be maintained, said maintenance judgment means causes said communication unit to transfer the image data to the other image processing apparatuses and deletes the received image data from the image processing apparatus, and
said maintenance judgment means attaches information for identifying an image processing apparatus, which is an origin of the image data, to the image data as a transference history of the image data when the image data is to be transferred.

3. The image processing apparatus as claimed in claim 2, further comprising:
appending information attaching means for attaching the appending information to the image data.

4. The image processing apparatus as claimed in claim 2, further comprising:
composite means for composing the image data with the other image data based on the correlativity information.

5. The image processing apparatus as claimed in claim 2,
wherein said appending information generating means generates information indicating contents of the image data as the appending information by analyzing the image.

6. The image processing apparatus as claimed in claim 2,
wherein said appending information generating means generates processing conditions for processing the image data as the appending information by analyzing the image.

7. The image processing apparatus as claimed in claim 2, further comprising:
selection means for selecting the other image data, that is to be used for judgment of the correlativity, using at least a part of the appending information.

8. The image processing apparatus as claimed in claim 7,
wherein said selecting repeats until a predetermined number of the other image data are selected.

9. An image processing apparatus, comprising:
appending information generating means for generating appending information based on contents of an image data when the image data is received from outside of the image processing apparatus;
a data storage unit for storing an other image data including the appending information;
correlativity judgment means for judging a correlativity between the image data and the another image data based on the appending information;
maintenance judgment means for judging whether the received image data is to be maintained in the data storage unit based on the correlativity, wherein
when the maintenance judgment means judges that the image data is not to be maintained, the maintenance judgment means deletes the received image data from the image processing apparatus,
selection means for selecting the other image data, that is to be used for judgment of the correlativity, using at least a part of the appending information;
wherein said correlativity judgment means further judges whether the correlativity between the selected other image data and the image data is higher than a predetermined value, and
said selection means repeats to select a plurality of the other image data until the other image data, of which the correlativity with the image data is higher than the predetermined value, are selected more than a predetermined number.

10. The image processing apparatus as claimed in claim 7,
wherein said selecting repeats until a predetermined number of the other image data are selected, and
said maintenance judgment means judges that the received image data is not to be maintained if only the other image data of which the correlativity with the received image data is lower than a predetermined reference value is selected.

11. The image processing apparatus as claimed in claim 7,
wherein said maintenance judgment means judges that the received image data is not to be maintained if an average of the correlativity between the received image data and the other image data is less than an average of the correlativity among the other image data in the data storage unit.

12. The image processing apparatus as claimed in claim 2,
wherein said maintenance judgment means further attaches information for identifying an other image processing apparatus, which is a destination of the image data, to the image data as a transference history of the image data when the image data is to be transferred.

13. The image processing apparatus as claimed in claim 2, wherein the image data received from outside of the image processing apparatus is through a network.

14. An image processing method, comprising the steps of:
generating appending information based on contents of an image data received by an image processing apparatus when the image data is received from outside of the image processing apparatus;

storing in a data storage unit an other image data including the appending information;

judging a correlativity between the image data and the other image data based on the appending information;

judging whether the received image data is to be maintained in the data storage unit based on the correlativity;

communicating with other image processing apparatuses, and when it is judged that the image data is not to be maintained, transferring the image data to the other image processing apparatuses and deleting the image data from the image processing apparatus; and attaching information for identifying an image processing apparatus, which is an origin of the image data, to the image data as a transference history of the image data when the image data is to be transferred.

15. The image processing method as claimed in claim 14, wherein the image data received from outside of the image processing apparatus is through a network.

16. A computer readable medium storing thereon a program for causing a computer to function by:
generating appending information based on contents of an image data received by an image processing apparatus when the image data is received from outside of the image processing apparatus;

storing in a data storage unit an other image data including the appending information;

judging a correlativity between the received image data and the other image data based on the appending information;

judging whether the received image data is to be maintained in the data storage unit based on the correlativity;

communicating with other image processing apparatuses, and when it is judged that the image data is not to be maintained, transferring the image data to the other image processing apparatuses and deleting the image data from the image processing apparatus; and attaching information for identifying an image processing apparatus, which is an origin of the image data, to the image data as a transference history of the image data when the image data is to be transferred.

17. The computer readable medium as claimed in claim 16, wherein the image data received from outside of the image processing apparatus is through a network.

* * * * *